United States Patent
Amizic et al.

(10) Patent No.: US 8,811,534 B2
(45) Date of Patent: *Aug. 19, 2014

(54) CLOSED LOOP POWER NORMALIZED TIMING RECOVERY FOR 8 VSB MODULATED SIGNALS

(75) Inventors: Bruno Amizic, Chicago, IL (US); Tyler Brown, Mundelein, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/427,387

(22) Filed: Apr. 21, 2009

(65) Prior Publication Data

US 2009/0225820 A1 Sep. 10, 2009

Related U.S. Application Data

(62) Division of application No. 11/258,735, filed on Oct. 26, 2005.

(51) Int. Cl.
*H03K 9/00* (2006.01)

(52) U.S. Cl.
USPC ............ 375/316; 375/326; 375/286; 714/700

(58) Field of Classification Search
USPC ........... 375/224, 326, 286, 350, 316; 714/700
See application file for complete search history.

(56) References Cited

U.S. PATENT DOCUMENTS

| | | | |
|---|---|---|---|
| 5,454,015 A | 9/1995 | Olafsson | |
| 5,881,098 A | 3/1999 | Tzou | |
| 5,978,759 A | 11/1999 | Tsushima et al. | |
| 5,991,336 A | 11/1999 | Scholtz et al. | |
| 6,067,319 A | 5/2000 | Copeland | |
| 6,381,291 B1* | 4/2002 | Yom | 375/350 |
| 6,449,244 B1 | 9/2002 | Loseke | |
| 6,986,080 B2* | 1/2006 | Kim et al. | 714/700 |
| 7,072,425 B2 | 7/2006 | Jun et al. | |
| 7,095,805 B2 | 8/2006 | Jun | |
| 7,263,142 B2* | 8/2007 | Kim et al. | 375/344 |
| 2003/0026369 A1* | 2/2003 | Murray et al. | 375/355 |
| 2003/0194024 A1* | 10/2003 | Edde | 375/326 |
| 2003/0221142 A1* | 11/2003 | Kim et al. | 714/700 |
| 2005/0141660 A1 | 6/2005 | Kim | |
| 2006/0045210 A1 | 3/2006 | Lee | |
| 2007/0088515 A1 | 4/2007 | Kim | |

OTHER PUBLICATIONS

M.D. Zoltowski et al., "Closed-Form 2D Angle Estimation With Rectangular Arrays in Element Space or Beamspace via Unitary ESPRIT", IEEE Transactions on Signal Processing, vol. 44, No. 2 Feb. 1996, pp. 316-328.

F. Gini et al., "Frequency Offset and Symbol Timing Recovery in Flat-Fading Channels: A Cyclostationary Approach", IEEE Transactions on Communications, vol. 46, No. 3, Mar. 1998, pp. 400-411.

W. Gardner, "Signal Interception: A Unifying Theoretical Framework for Feature Detection", IEEE Transactions on Communications, vol. 36, No. 8, Aug. 1988, pp. 897-906.

F.M. Gardner, "A BPSK/QPSK Timing-Error Detector for Sampled Receivers", IEEE Transactions on Communications, vol. Com-34, No. 5, May 1986, pp. 423-429.

(Continued)

*Primary Examiner* — Eva Puente

(57) ABSTRACT

A receiver timing error recovery loop expands the bandwidth of a received signal and determines the timing error based on the bandwidth expanded received signal.

4 Claims, 3 Drawing Sheets

(56) References Cited

OTHER PUBLICATIONS

S. Houcke et al., "Joint Blind Equalization and Estimation of the Symbol Period: A Contrast Function Approach.", in ICASSP 2001, pp. 2545-2548.

B. Koblents et al., "Asynchronous Timing Recovery in DSP Based PSK Modems", in ASILOMAR, Oct. 2-28, 1992, vol. 2, pp. 632-641.

A. Papoulis, "Probability, Random Variables and Stochastic Processes", 3rd Edition, ISBN 0-07-048477-5, p. 395, 1991.

Moon et al., "Timing Recovery in CMOS using Nonlinear Spectral-line Method", IEEE May 5, 1996, Custom Integrated Circuits Conference, pp. 13-16.

Miyake et al., "A New Timing Extraction Method and Data Interpolation for Block Demodulation", Speech Processing 2, Digital Signal Processing, Intl. Conf. on Acoustics, May 23, 1989, pp. 1223-1226.

M.D. Zoltowski et al., "Closed-Form 2D Angle Estimation With Rectangular Arrays Via DFT Beamspace ESPRIT", Signals, Systems & Computers, 1995, pp. 682-687.

\* cited by examiner

US 8,811,534 B2

CLOSED LOOP POWER NORMALIZED TIMING RECOVERY FOR 8 VSB MODULATED SIGNALS

RELATED APPLICATIONS

The present application is a divisional of U.S. patent application Ser. No. 11/258,735 filed on Oct. 26, 2005. The present application relates to subject matter similar to the subject matter disclosed in application Ser. No. 10/278,350 filed on Oct. 23, 2002 and to the subject matter disclosed in application Ser. No. 11/278,700 filed on Oct. 26, 2005.

TECHNICAL FIELD OF THE INVENTION

The present invention relates to timing recovery in digital receivers.

BACKGROUND OF THE INVENTION

Timing recovery is an important digital receiver function in which the frequency and phase of the receiver's sampling clock are adjusted in order to minimize inter-symbol interference as well as to compensate for possible sampling frequency drifts between the transmitter and receiver's sampling clocks. Sampling the received signal at the optimum sampling instant is important for detection purposes. By sampling the received waveform at the optimum sampling instants, a smaller probability of error in the detection stage is obtained. However, if there is a mismatch between the transmitter and receiver's clocks, the received signal will be sampled at the wrong times, which will increase the level of sampling noise (also known as timing jitter) and introduce sampling frequency drifts. Minimizing timing jitter and preventing sampling frequency drifts are two important timing recovery objectives.

A simple, non-data aided, widely used timing recovery algorithm for band-limited amplitude modulated data streams is known as the Gardner technique and is shown in FIGS. 1 and 2. FIG. 1 illustrates how a Gardner timing error detector 10 can be incorporated into the timing recovery architecture.

As shown in FIG. 1, a signal on an input 12 is sampled by a sampler 14 and the sampled signal is provided to the Gardner timing error detector 10. The Gardner timing error detector 10 detects a timing error based on three successive samples and provides the detected timing error to a loop filter 16. The output of the loop filter 16 controls a numerically controlled oscillator (NCO) 18 which adjusts the timing of the sampler 14 in accordance with the output of the loop filter 16.

The Gardner timing error detector 10 was originally designed for BPSK/QPSK receivers, but it can be shown that the Gardner timing error detector works successfully for higher order constellations. The Gardner timing error detector 10 typically uses two samples per symbol for its operation and is based on the transmitted pulse shape symmetry.

As shown in FIG. 2, the input to the Gardner timing error detector 10 is provided to an input of a first one sample delay 20 and to a positive input of a summer 22. The output of the first one sample delay 20 is provided to an input of a second one sample delay 24 and to one input of a multiplier 26. The output of the second one sample delay 24 is provided to a negative input of the summer 22, and the output of the summer 22 is provided to the other input of the multiplier 26.

The Gardner timing error detector 10 works well for a flat or clean channel with the assumption of a white Gaussian noise environment. However, the Gardner timing error detector 10 is sensitive to nulls in the spectrum of the received pulse. In particular, when a null exists at half the transmitted symbol rate, the accuracy of the timing indications produced by the Gardner timing error detector 10 is reduced.

The spectrum of the received pulse, which is the product of the spectrum of the transmitted pulse and the spectrum of the channel, will have a null at a particular frequency when the spectrum of the channel has a null at that frequency. Nulls in the channel spectrum can occur when the transmitted signal travels through multiple paths between the transmitter and the receiver. In this phenomenon, known as multi-path propagation, certain frequency components of the signals arriving at the receiver will add destructively (interfere) resulting in nulls in the spectrum at those frequencies. Multi-path propagation is typically present when, in addition to a direct path between the transmitter and the receiver, additional paths are present due to reflections of the transmitted signal off of objects such as buildings, terrain, and moving objects.

The present invention overcomes one or more of these or other problems.

SUMMARY OF THE INVENTION

According to one aspect of the present invention, a method of detecting a receiver timing error with respect to a received signal comprises the following: expanding the bandwidth of the received signal; and, determining the timing error based on the bandwidth expanded received signal, wherein the timing error is determined by use of a timing error detector employing at least one delay element.

According to another aspect of the present invention, a timing recovery loop comprises a sampler, a bandwidth expander, a timing error detector, a loop filter, and a sample controller. The sampler samples a received signal. The bandwidth expander expands the bandwidth of the sampled received signal. The timing error detector detects a timing error with respect to the bandwidth expanded received signal, and the timing error detector includes at least one delay element. The loop filter filters the detected timing error. The sample controller controls the sampler in response to the filtered and detected timing error.

According to still another aspect of the present invention, a timing recovery detector comprises a multiplier, a complex conjugate operator, a first delay element, and a timing error detector. The multiplier has first and second inputs and an output, the first input receives a received signal, and the output provides a multiplier output. The complex conjugate operator has an input and an output, the input of the complex conjugate operator receives the received signal, and the output of the complex conjugate operator provides the complex conjugate of the sampled received signal. The first delay element is between the output of the complex conjugate operator and the second input of the multiplier. The timing error detector detects a timing error with respect to the multiplier output, and the timing error detector includes at least one second delay element.

BRIEF DESCRIPTION OF THE DRAWINGS

These and other features and advantages will become more apparent from a detailed consideration of the invention when taken in conjunction with the drawings in which.

DETAILED DESCRIPTION

Figure 3:
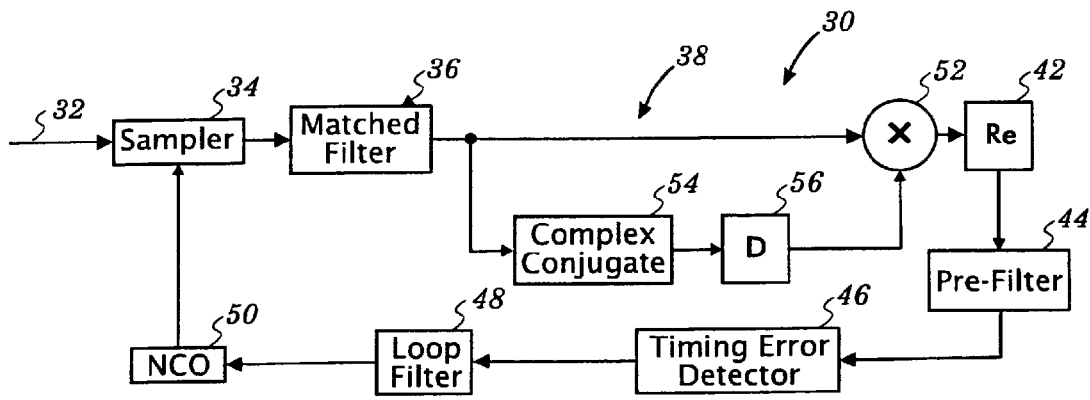
FIG. 3 illustrates a timing recovery loop in accordance with an embodiment of the present invention.
Figure 6:
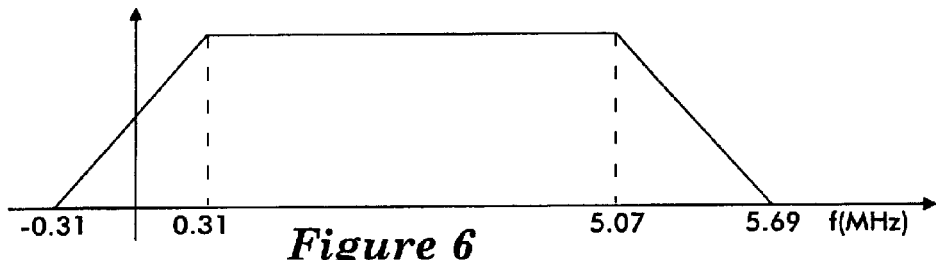
FIG. 6 illustrates the power spectrum for 8 VSB data modulation.
Figure 7:
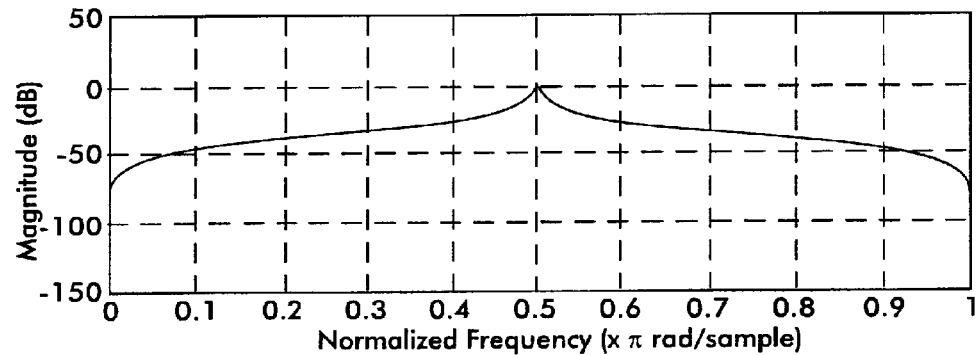
FIG. 7 shows the frequency response of the pre-filter of FIG. 3.
Figure 7:
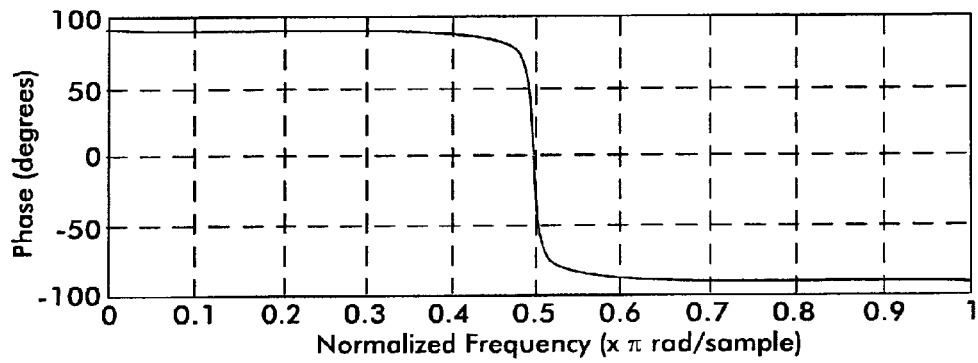

A timing recovery loop 30 shown in FIG. 3 receives a signal on an input 32. The timing recovery loop 30 may be, for example, an 8-VSB timing recovery loop. The received signal is sampled by a sampler 34, and the sampled signal is filtered by a complex matched filter 36. The filtered signal is processed by a bandwidth expander 38. The real part of the output of the bandwidth expander 38 is extracted at 42 and the extracted real part of the output of the bandwidth expander 38 is supplied to a pre-filter 44. The pre-filter 44 is a narrow band filter arranged to pass only the upper band edge of the output of the bandwidth expander 38 (i.e., not the lower band edge of the output of the bandwidth expander 38). The width of the passband of the pre-filter 40 may be, for example, approximately 50 kHz and the center of the passband may be, for example, 5.381 MHz. The received signal for a standard 6 MHz channel has the spectrum shown in FIG. 6. The frequency response of the pre-filter 44 is shown in FIG. 7.

Figure 8:
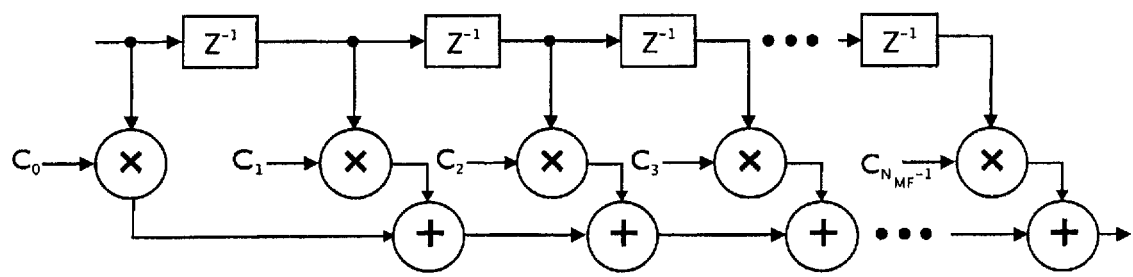
FIG. 8 illustrates an example of a matched filter that can be used for the complex matched filter of FIG. 3; and, FIG. 9 illustrates an example of a pre-filter that can be used for the pre-filter of FIG. 3.

An example of a matched filter that can be used for the complex matched filter 36 is shown in FIG. 8. The input of the matched filter shown in FIG. 8 is the input to the first $Z^{-1}$ delay element, and the output of the matched filter shown in FIG. 8 is the last summer. The inputs $C_0$ etc. are for the tap weights of the complex matched filter.

Figure 9:
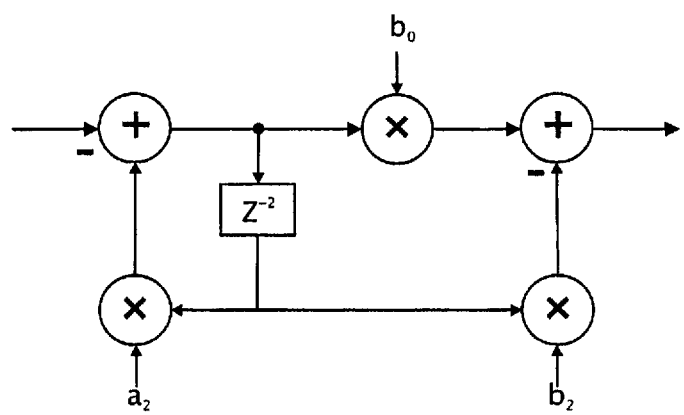

An example of a pre-filter that can be used for the pre-filter 40 is shown in FIG. 9. The input of the pre-filter shown in FIG. 9 is the input to the first summer, and the output of the pre-filter shown in FIG. 9 is the last summer. The inputs $b_0$, $a_2$, and $b_2$ are constants that define the band width and center for the pre-filter.

The output of the pre-filter 44 is provided to a timing error detector 46. The timing error detector 46 detects a timing error between the transmitter and receiver clocks and provides the detected timing error to a loop filter 48. The output of the loop filter 48 controls a numerically controlled oscillator 50 which adjusts the timing of the sampler 34 in accordance with the output of the loop filter 48.

The bandwidth expander 38 receives the output of the complex matched filter 36. The output of the complex matched filter 36 is supplied directly to one input of a multiplier 52 of the bandwidth expander 38. The complex conjugate of the output of the complex matched filter 36 is determined at 54, the complex conjugate of the output of the sampler 34 is delayed by a delay element 56, and the delayed complex conjugate of the output of the complex matched filter 36 is applied to a second input of the multiplier 52. The delay element 56 may have a delay of, for example, 0, $T_{sym}/2$, $3T_{sym}/2$, etc., where the period $T_{sym}$ is the symbol period in the 8 VSB digital television signal according to the ATSC Digital Television Standard.

The bandwidth expander 38 expands the width of the received signal in the frequency domain and, therefore, is referred to herein as a bandwidth expander. In the special case where the delay element 56 is set for a zero delay, the output of the multiplier 52 is the magnitude squared of the output of the complex matched filter 36.

An 8 VSB signal is a linear modulated 8-ary PAM signal with real-valued symbols s[k] and a complex pulse shape q(t). As discussed above, the power spectrum for 8 VSB data modulation is shown in FIG. 6. The real-valued symbols s[k] are uniformly distributed and are independent random variables with symbol levels $\{-7, -5, -3, -1, 1, 3, 5, 7\}$.

The output of a free running carrier recovery loop at 12 is given by the following equation:

$$v(t) = e^{j\Delta\omega t}\frac{1}{2}\left\{\sum_k s[k]\left\{\sum_{i=1}^{M}\gamma_i q(t-\tau_i-kT_{sym})e^{-j[\omega_c\tau_i-\phi+\theta]}\right\} + \frac{\hat{A}}{2}e^{-j\hat{\theta}}\right\} \quad (1)$$

where s[k] is the transmitted symbol stream, $q_R$ and $q_I$ are the real and imaginary parts of the complex square root raised cosine pulse q, $\hat{A}$ and $\hat{\theta}$ are the average amplitude and phase of the pilot, $\phi$ is the transmitted carrier phase, $\Delta\omega$ is the free running carrier frequency error, $\theta$ is the free running carrier phase of the numerical control oscillator 50, M is the number of multipaths in the channel, $\tau_i$ are the path delays of the multipaths in the channel, and $\gamma_i$ are the real path gains.

For convenience in Gardner timing recovery, it may be assumed that the channel is an AWGN No Ghost channel where $\tau_i$ is set to 2, and where $\Delta\omega=0$. Based on equation (1) and these assumptions, the received signal is given by the following equation:

$$r(t) = \sum_k s[k]q(t-\tau-kT_{sym}) + w(t) \quad (2)$$

where w(t) is white Gaussian noise AWGN.

As shown in FIG. 3, the first operation following sampling in the timing recovery loop 30 is the matched filtering performed by complex matched filter 36. The output of the complex matched filter 36 is denoted y(t) and is given by the following equation:

$$y(t) = \int_{-\infty}^{+\infty} r(\lambda)q^*(\lambda-t)d\lambda \quad (3)$$

Combining equations (2) and (3) produces the following equation:

$$y(t) = \sum_k s[k]\hat{p}(t-\tau-kT_{sym}) + w(t)*q^*(-t) \quad (4)$$

where $\hat{p}(t)$ is the complex raised cosine pulse obtained by convolving the transmitted pulse shape q(t) with the matched filter impulse response $q^*(-t)$, and where the superscript * represents the complex conjugate.

Rewriting equation (4) produces the following equation:

$$y(t) = \sum_k s[k]p(t - \tau - kT_{sym})e^{j2\pi\frac{f_{sym}}{4}(t-\tau-kT_{sym})} + w(t) * q^*(-t) \quad (5)$$

where p(t) the real part of the raised cosine pulse.

Ignoring noise, the operation performed by the bandwidth expander 38 is given by the following equation:

$$z(t) = y(t)y^*(t-D) \quad (6)$$

where D represents the delay imposed by the delay element 56. The product z(t) given by equation (6) may be expanded in accordance with equation (5) to produce the following equation:

$$z(t) = \sum_k \sum_l s[k]s[l]p(t - \tau - kT_{sym})p(t - \tau - D - lT_{sym}) \quad (7)$$

-continued $$\left\{ e^{j2\pi\frac{f_{sym}}{4}(t-\tau-kT_{sym})} e^{-j2\pi\frac{f_{sym}}{4}(t-\tau-lT_{sym}-D)} \right\}$$

$$= \sum_k \sum_l s[k]s[l]p(t - \tau - kT_{sym})p(t - \tau - D - lT_{sym})$$

$$\left\{ e^{j2\pi\frac{f_{sym}}{4}(D+(l-k)T_{sym})} \right\}$$

If D=0, equation (7) is independent of any carrier phase offset, which allows passband timing recovery. However, other values of D are possible because equation (7) can still be considered to be carrier phase independent if it is assumed that the carrier phase slowly varies throughout the time interval D.

Therefore, the extracted real part of the output of the bandwidth expander 38 is denoted r(t) and is given by the following equation:

$$r(t) = \text{Re}\{z(t)\} \quad (8)$$

$$= \sum_k \sum_l s[k]s[l]p(t - \tau - kT_{sym})p(t - \tau - D - lT_{sym})$$

$$\cos\left(2\pi\frac{f_{sym}}{4}(D + (l-k)T_{sym})\right)$$

Figure 1:
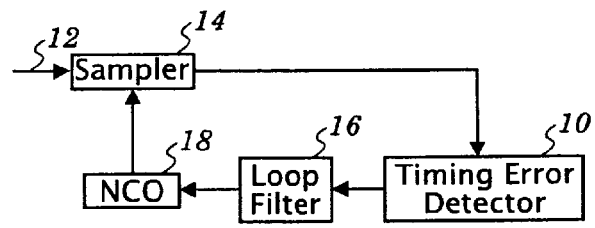
FIG. 1 illustrates a standard timing recovery loop utilizing a Gardner timing error detector.
Figure 2:
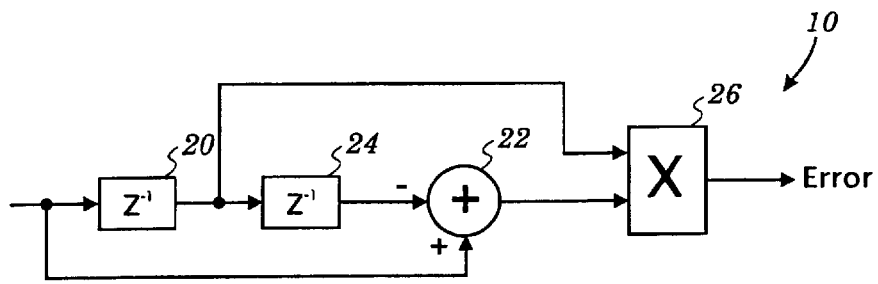
FIG. 2 shows in more detail the Gardner timing error detector of FIG. 1.

The timing error detector 46, when implemented as shown in FIG. 2, is given by the following equation:

$$e[n] = r\left[\left(n - \frac{1}{2}\right)T_{sym} + \hat{\tau}_{n-1}\right]\{r[(n-1)T_{sym} + \hat{\tau}_{n-1}] - r[nT_{sym} + \hat{\tau}_n]\} \quad (9)$$

When the signal represented by equation (8) is processed according to equation (9), the expected value of the result is given by the following equation:

$$E\{e[n]\} = E\left\{\sum_k \sum_l C_1 s[k]s[l]p\left[\left(n - \frac{1}{2}\right)T_{sym} + \hat{\tau}_{n-1} - \tau - kT_{sym}\right]\right.$$

$$p\left[\left(n - \frac{1}{2}\right)T_{sym} + \hat{\tau}_{n-1} - \tau - D - lT_{sym}\right] - \sum_i \sum_j C_2 s[i]s[j]$$

$$\left. p[(n-1)T_{sym} + \hat{\tau}_{n-1} - \tau - iT_{sym}]p[(n-1)T_{sym} + \hat{\tau}_{n-1} - \tau - D - jT_{sym}]\right\}$$

$$E\left\{\sum_k \sum_l C_1 s[k]s[l]p\left[\left(n - \frac{1}{2}\right)T_{sym} + \hat{\tau}_{n-1} - \tau - kT_{sym}\right]\right.$$

$$p\left[\left(n - \frac{1}{2}\right)T_{sym} + \hat{\tau}_{n-1} - \tau - D - lT_{sym}\right]$$

$$\left. \sum_i \sum_j C_2 s[i]s[j]p[nT_{sym} + \hat{\tau}_n - \tau - iT_{sym}]p[nT_{sym} + \hat{\tau}_n - D - jT_{sym}]\right\} \quad (10)$$

where $$C_1 = \cos\left(2\pi\frac{f_{sym}}{4}(D + (l-k)T_{sym})\right) \quad (11)$$

$$C_2 = \cos\left(2\pi\frac{f_{sym}}{4}(D + (j-i)T_{sym})\right) \quad (12)$$

The equation for the timing recovery loop shown in FIG. 3 has the form given by the following equation:

$$\hat{\tau}_{n+1} = \hat{\tau}_n + \gamma e[n] \quad (13)$$

where γ is the loop gain.

In order to further simplify equation (10), the following definitions can be made:

$$E\{s[k]s[l]s[i]s[j]\} = \begin{cases} \sigma_s^4 & \text{for } k = l = i = j \\ 0 & \text{for } k \neq l \neq i \neq j \end{cases} \quad (14)$$

The quantity $\sigma_s^2$, for example, may be the variance or power of the symbols. Thus, for VSB symbol values of ±7,5,3,1, $\sigma_s^2$ can be computed as the square of $(7*7)/4+(5*5)/4+(3*3)/4+(1*1)/4=(49+25+9+1)/4=84/4=21$. Accordingly, $\sigma_s^4=441$.

The steady state performance of the timing recovery loop of FIG. 3 can then be analyzed as follows. In the steady state, $\tau_{n-1} = \tau_n = \hat{\tau}$. Also, $\tau - \hat{\tau}$ may be defined as $\delta$. Therefore, at steady state, and with $\delta$ defined as stated above, equation (10) may be rewritten as given by the following equation:

$$S(\delta) = \qquad (15)$$
$$C^2 \sigma_s^4 \sum_i p\left[\left(i - \frac{1}{2}\right)T_{sym} - \delta\right] p\left[\left(i - \frac{1}{2}\right)T_{sym} - \delta - D\right] p[(i-1)T_{sym} - \delta]$$
$$p[(i-1)T_{sym} - \delta - D] -$$
$$C^2 \sigma_s^4 \sum_i p\left[\left(i - \frac{1}{2}\right)T_{sym} - \delta\right] p\left[\left(i - \frac{1}{2}\right)T_{sym} - \delta - D\right]$$
$$p[iT_{sym} - \delta] p[iT_{sym} - \delta - D]$$

where $$C = \cos\left(2\pi \frac{f_{sym}}{4} D\right) \qquad (16)$$

where $\tau$ is the actual timing offset, where $\hat{\tau}$ is the estimated timing offset, and where $\delta$ is the error between $\tau$ and $\hat{\tau}$.

The analog version of equation (15) is given by the following equation:

$$S(\delta) = C^2 \sigma_s^4 \int_t p\left(t - \frac{T_{sym}}{2} - \delta\right) p\left(t - \frac{T_{sym}}{2} - \delta - D\right)$$
$$p(t - T_{sym} - \delta) p(t - T_{sym} - \delta - D) - C^2 \sigma_s^4 \int_t$$
$$p\left(t - \frac{T_{sym}}{2} - \delta\right) p\left(t - \frac{T_{sym}}{2} - \delta - D\right) p(t - \delta) p(t - \delta - D)$$
$$= C^2 \sigma_s^4 \int_t \underbrace{\underbrace{p\left(t - \frac{T_{sym}}{2} - \delta\right) p(t - T_{sym} - \delta)}_{h\left(\left(t - \frac{T_{sym}}{2}\right)\right)} \underbrace{p\left(t - \frac{T_{sym}}{2} - \delta - D\right) p(t - T_{sym} - \delta - D)}_{h\left(t - \frac{T_{sym}}{2} - D\right)}}_{h_1\left(t - \frac{T_{sym}}{2}\right)}$$
$$C^2 \sigma_s^4 \int_t \underbrace{\underbrace{p(t - \delta) p\left(t - \frac{T_{sym}}{2} - \delta\right)}_{h(t)} \underbrace{p(t - \delta - D) p\left(t - \frac{T_{sym}}{2} - \delta - D\right)}_{h(t-D)}}_{h_1(t)}$$

$$(17)$$

According to Poisson's sum formula, the following equation is obtained:

$$\sum_i h_1(iT_{sym}) = \frac{1}{T_{sym}} \sum_i H_1\left(\frac{i}{T_{sym}}\right) \qquad (18)$$

which applies to any finite energy signal h(t) with Fourier Transform H(f). Identifying h(t) with $$p(t - \delta) p\left(t - \frac{T_{sym}}{2} - \delta\right),$$

and p(t) and P(f) as a Fourier Transform pair, H(f) can be calculated as given by the following equation:

$$H(f) = \dot{H}(f) e^{-j2\pi f \delta} \qquad (19)$$

where $$\dot{H}(f) = \int_{-\infty}^{+\infty} P(v) P(f - v) e^{-j\pi v T_{sym}} dv \qquad (20)$$

$$H_1(f) = F\{h(t) h(t-D)\}$$

$$= \int_{-\infty}^{+\infty} H(v) H(f - v) e^{-j2\pi v D} dv \qquad (21)$$

$$= \int_{-\infty}^{+\infty} \dot{H}(v) e^{-j2\pi v \delta} \dot{H}(f - v) e^{-j2\pi(f-v)\delta} e^{-j2\pi v D} dv \qquad (22)$$

$$= e^{-j2\pi f \delta} \underbrace{\int_{-\infty}^{+\infty} \dot{H}(v) \dot{H}(f - v) e^{-j2\pi v D} dv}_{\breve{H}(f)} \qquad (23)$$

$$= \breve{H}(f) e^{-j2\pi f \delta} \qquad (24)$$

Therefore, $$\sum_i h_1(iT_{sym}) = \frac{1}{T_{sym}} \sum_i \breve{H}\left(\frac{i}{T_{sym}}\right) e^{-j2\pi \frac{i}{T_{sym}} \delta} \qquad (25)$$

Assuming a raised cosine pulse bandwidth that is less than $1/(2T_{sym})$ MHz so that $P(f)=0$ for $|f|>1/(2T_{sym})$ MHz, $\breve{H}(i/T_{sym})=0$ for $i \neq -1, 0, +1$. Therefore, equation (25) becomes the following equation:

$$\sum_i h_1(iT_{sym}) = \frac{1}{T_{sym}} \breve{H}(0) + \frac{1}{T_{sym}} \breve{H}\left(-\frac{1}{T_{sym}}\right) e^{j2\pi \frac{1}{T_{sym}} \delta} + \qquad (26)$$
$$\frac{1}{T_{sym}} \breve{H}\left(\frac{1}{T_{sym}}\right) e^{-j2\pi \frac{1}{T_{sym}} \delta}$$
$$= \frac{1}{T_{sym}} \breve{H}(0) + \frac{2}{T_{sym}} \text{Re}\left\{\breve{H}\left(\frac{1}{T_{sym}}\right) e^{-j2\pi \frac{1}{T_{sym}} \delta}\right\}$$

because $$\breve{H}\left(-\frac{1}{T_{sym}}\right) = \breve{H}^*\left(\frac{1}{T_{sym}}\right)$$

which is shown below.

Following the same analysis given by equations (18)-(26), the first summation of equation (15) can be written according to the following equation:

$$\sum_i h_1\left(\left(i-\frac{1}{2}\right)T_{sym}\right) = \frac{1}{T_{sym}}\breve{H}(0) - \frac{2}{T_{sym}}\mathrm{Re}\left\{\breve{H}\left(\frac{1}{T_{sym}}\right)e^{-j2\pi\frac{1}{T_{sym}}\delta}\right\}$$

and equation (15) now becomes the following equation:

$$S(\delta) = -\frac{4C^2\sigma_s^4}{T_{sym}}\mathrm{Re}\left\{\breve{H}\left(\frac{1}{T_{sym}}\right)e^{-j2\pi\frac{1}{T_{sym}}\delta}\right\} \quad (27)$$

Equation (27) defines the S-curve of the timing error detector 46. The S-curve is the expected value of the output of the timing error detector 46. In order to further simplify equation (27), the following equations may be noted:

$$\breve{H}\left(\frac{1}{T_{sym}}\right) = \int_{-\infty}^{+\infty} \dot{H}(\upsilon)\dot{H}\left(\frac{1}{T_{sym}}-\upsilon\right)e^{-j2\pi\upsilon D}d\upsilon \quad (28)$$

$$= e^{-j\frac{\pi}{T_{sym}}D}\int_{-\infty}^{+\infty} \dot{H}\left(\frac{1}{2T_{sym}}+f\right)e^{j2\pi fD}df$$

$$\breve{H}\left(-\frac{1}{T_{sym}}\right) = \int_{-\infty}^{+\infty} \dot{H}(\upsilon)H\left(-\frac{1}{T_{sym}}-\upsilon\right)e^{-j2\pi\upsilon D}d\upsilon \quad (29)$$

$$= e^{j\frac{\pi}{T_{sym}}D}\int_{-\infty}^{+\infty} \dot{H}\left(-\frac{1}{2T_{sym}}+f\right)\dot{H}\left(-\frac{1}{2T_{sym}}-f\right)e^{-j2\pi fD}df$$

$$\dot{H}(f) = F\left\{\underbrace{p(t)p\left(t-\frac{T_{sym}}{2}\right)}_{\text{symmetric(even)around }T_{sym}/4}\right\} \quad (30)$$

$$= F\left\{\underbrace{p\left(t+\frac{T_{sym}}{4}\right)p\left(t-\frac{T_{sym}}{4}\right)}_{a(t);\text{symmetric(even)}}\right\}e^{-j2\pi f\frac{T_{sym}}{4}}$$

$$= \underbrace{A(f)}_{\text{real,even}} e^{-j\pi f\frac{T_{sym}}{2}}$$

where
$$A(f) = F\{a(t)\}$$

where F denotes Fourier Transform.

It is noted that A(f) is even and real because a(t) has even symmetry since p(t) is even. Substituting equation (30) into equation (28) produces the following equation:

$$\breve{H}\left(\frac{1}{T_{sym}}\right) = -je^{-j\frac{\pi}{T_{sym}}D}\int_{-\infty}^{+\infty}\underbrace{A\left(\frac{1}{2T_{sym}}-f\right)A\left(\frac{1}{2T_{sym}}+f\right)}_{\text{even real function}} \quad (31)$$

$$e^{j2\pi fD}df$$

$$= -je^{-j\frac{\pi}{T_{sym}}D}\int_{-\infty}^{+\infty}A\left(\frac{1}{2T_{sym}}-f\right)A\left(\frac{1}{2T_{sym}}+f\right)$$

$$\cos\{2\pi fD\}df$$

$$= -je^{-j\frac{\pi}{T_{sym}}D}K$$

where K is defined according to the following equation:

$$K = \int_{-\infty}^{+\infty}A\left(\frac{1}{2T_{sym}}-f\right)A\left(\frac{1}{2T_{sym}}+f\right)\cos(2\pi fD)df \quad (32)$$

Similarly, by substituting equation (30) into equation (29), the following equation is obtained:

$$\breve{H}\left(-\frac{1}{T_{sym}}\right) = je^{j\frac{\pi}{T_{sym}}D}\int_{-\infty}^{+\infty}\underbrace{A\left(\frac{1}{2T_{sym}}-f\right)A\left(\frac{1}{2T_{sym}}+f\right)}_{\text{even real function}} \quad (33)$$

$$e^{-j2\pi fD}df$$

$$= je^{j\frac{\pi}{T_{sym}}D}\int_{-\infty}^{+\infty}A\left(\frac{1}{2T_{sym}}-f\right)A\left(\frac{1}{2T_{sym}}+f\right)$$

$$\cos\{2\pi fD\}df$$

$$= je^{j\frac{\pi}{T_{sym}}D}K$$

$$= \breve{H}^*\left(\frac{1}{T_{sym}}\right)$$

By substituting equation (31) into equation (27), the following equation is obtained:

$$S(\delta) = \frac{4C^2\sigma_s^4 K}{T_{sym}}\sin\left(\frac{2\pi}{T_{sym}}\left(\delta+\frac{D}{2}\right)\right) \quad (34)$$

It can be seen that the S-curve of the timing error detector 46 has the period $T_{sym}$ and passes through the origin at $\delta=0$ for D=0. The amplitude of the S-curve is proportional to K, which depends on the rolloff factor $\alpha$. As $\alpha$ decreases, K decreases, and if K decreases sufficiently, the amplitude of the S-curve can become inadequate for the time tracking operation.

K depends on A(f) which is the Fourier transform of a(t) which is defined in equation (33) to be a function of p(t), and p(t) is the real part of the raised cosine pulse which in turn is determined by the rolloff factor $\alpha$. The rolloff factor $\alpha$ is a fixed constant given in the digital television standard. The rolloff factor $\alpha$ is set to be sufficiently large to have an adequate S-curve amplitude.

Certain modifications of the present invention have been discussed above. Other modifications of the present invention will occur to those practicing in the art of the present invention. For example, the timing error detector 10 as shown in FIG. 2 may be used for the timing error detector 46 in the timing recovery loop 30. However, other timing error detectors can be used for the timing error detector 46 in the timing recovery loop 30.

Figure 4:
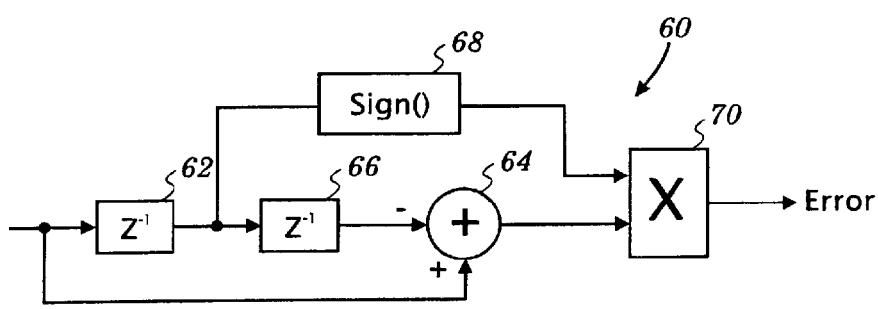
FIG. 4 illustrates another timing error detector that can be used in the timing recovery loop of FIG. 3.

For example, a timing error detector 60 shown in FIG. 4 is another timing error detector that may be used for the timing error detector 46 of FIG. 3. The timing error detector 60 is a modification of the timing error detector 10. The input to the timing error detector 60 is provided to an input of a first one sample delay 62 and to a positive input of a summer 64. The output of the first one sample delay 62 is provided to an input of a second one sample delay 66 and to a sign extractor 68. The output of the second one sample delay 66 is provided to a negative input of the summer 64, and the output of the summer 64 is provided to one input of a multiplier 70. An output of the sign extractor 68 is provided the other input of the multiplier 70. The sign extractor 68 provides a +1 or a −1 to the multiplier 70 depending upon whether the output of the first one sample delay 62 is positive or negative, respectively.

Figure 5:
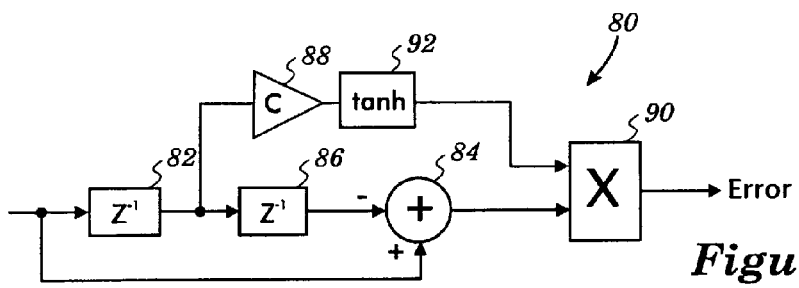
FIG. 5 illustrates still another timing error detector that can be used in the timing recovery loop of FIG. 3.

Another example of a timing error detector that may be used for the timing error detector 46 of FIG. 3 is a timing error detector 80 shown in FIG. 5. The timing error detector 80 is another modification of the timing error detector 10. The input to the timing error detector 80 is provided to an input of a first one sample delay 82 and to a positive input of a summer 84. The output of the first one sample delay 82 is provided to an input of a second one sample delay 86 and to an input of a gain element 88. The output of the second one sample delay 86 is provided to a negative input of the summer 84, and the output of the summer 84 is provided to one input of a multiplier 90. The gain element 88 applies a constant gain C to the output of the first one sample delay 82. A hyperbolic tangent function 92 determines the hyperbolic tangent of the output of the gain element 88 and provides this the hyperbolic tangent to the other input of the multiplier 90.

The timing recovery of the present invention is applicable to any linear digital modulation techniques. However, the present invention as particularly disclosed herein is applied to the 8 VSB data modulation scheme, which is currently being used for terrestrial high definition digital television transmissions.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of detecting a timing error in connection with a signal comprising:
    delaying the signal to produce a first delayed output;
    delaying the first delayed output to produce a second delayed output;
    subtracting the second delayed output from the signal to produce a subtraction output;
    extracting a characteristic of the first delayed output;
    multiplying the characteristic and the subtraction output to produce the timing error;
    wherein the extracting of a characteristic of the first delayed output comprises extracting a sign from the first delayed output, and
    wherein the multiplying of the characteristic and the subtraction output to produce the timing error comprises multiplying the sign and the subtraction output to produce the timing error.

2. A method of detecting a timing error in connection with a signal comprising:
    delaying the signal to produce a first delayed output;
    delaying the first delayed output to produce a second delayed output;
    subtracting the second delayed output from the signal to produce a subtraction output;
    extracting a characteristic of the first delayed output;
    multiplying the characteristic and the subtraction output to produce the timing error;
    wherein the extracting of a characteristic of the first delayed output comprises extracting a hyperbolic tangent of the first delayed output, and
    wherein the multiplying of the characteristic and the subtraction output to produce the timing error comprises multiplying the hyperbolic tangent and the subtraction output to produce the timing error.

3. A timing error detector that detects a timing error in connection with a signal comprising:
    a first delay that delays the signal to produce a first delayed output;
    a second delay that delays the first delayed output to produce a second delayed output;
    a subtractor that subtracts the second delayed output from the signal to produce a subtraction output;
    an extractor that extracts a characteristic of the first delayed output; and,
    a multiplier that multiplies the characteristic and the subtraction output to produce the timing error;
    wherein the extractor that extracts a characteristic of the first delayed output comprises an extractor that extracts a sign from the first delayed output, and
    wherein the multiplier that multiplies the characteristic and the subtraction output to produce the timing error comprises a multiplier that multiplies the sign and the subtraction output to produce the timing error.

4. A timing error detector that detects a timing error in connection with a signal comprising:
    a first delay that delays the signal to produce a first delayed output;
    a second delay that delays the first delayed output to produce a second delayed output;
    a subtractor that subtracts the second delayed output from the signal to produce a subtraction output;
    an extractor that extracts a characteristic of the first delayed output; and,
    a multiplier that multiplies the characteristic and the subtraction output to produce the timing error;
    wherein the extractor that extracts a characteristic of the first delayed output comprises an extractor that extracts a hyperbolic tangent of the first delayed output, and
    wherein the multiplier that multiplies the characteristic and the subtraction output to produce the timing error comprises a multiplier that multiplies the hyperbolic tangent and the subtraction output to produce the timing error.

* * * * *